United States Patent
Cui et al.

(10) Patent No.: US 10,228,973 B2
(45) Date of Patent: Mar. 12, 2019

(54) KERNEL POLICY OPTIMIZATION FOR COMPUTING WORKLOADS

(71) Applicant: HULU, LLC, Santa Monica, CA (US)

(72) Inventors: Yan Cui, Los Angeles, CA (US); Karthik Prasanna, Santa Monica, CA (US); Andres Rangel, Santa Monica, CA (US)

(73) Assignee: HULU, LLC, Santa Monica, CA (US)

( * ) Notice: Subject to any disclaimer, the term of this patent is extended or adjusted under 35 U.S.C. 154(b) by 138 days.

(21) Appl. No.: 15/064,355

(22) Filed: Mar. 8, 2016

(65) Prior Publication Data
US 2017/0262314 A1   Sep. 14, 2017

(51) Int. Cl.
*G06F 9/46* (2006.01)
*G06F 9/50* (2006.01)

(52) U.S. Cl.
CPC ........ *G06F 9/50* (2013.01); *G06F 2209/5019* (2013.01)

(58) Field of Classification Search
CPC ....................................................... G06F 9/52
USPC ....................................................... 718/104
See application file for complete search history.

(56) References Cited

U.S. PATENT DOCUMENTS

| | | | | |
|---|---|---|---|---|
| 6,120,549 A * | 9/2000 | Goslin | ............... | G06F 17/5045 703/20 |
| 6,795,928 B2 * | 9/2004 | Bradley | ............... | G06F 1/206 700/22 |
| 7,032,133 B1 * | 4/2006 | Lang | ............... | G06F 11/263 714/32 |
| 9,557,792 B1 * | 1/2017 | Potlapally | ............... | G06F 1/28 |
| 9,678,798 B2 * | 6/2017 | Farhan | ............... | G06F 9/5011 |
| 2003/0046396 A1 * | 3/2003 | Richter | ............... | G06F 9/505 709/226 |
| 2005/0257221 A1 * | 11/2005 | Inchingolo | ............... | G06Q 10/06 718/100 |
| 2006/0047808 A1 * | 3/2006 | Sharma | ............... | G06F 9/505 709/224 |
| 2006/0074970 A1 * | 4/2006 | Narayanan | ............... | G06F 11/3419 |

(Continued)

OTHER PUBLICATIONS

CFQ 10 scheduler. Retrieved from: http://en.wikipedia.org/wiki/CFQ, and printed on Feb. 3, 2016.

(Continued)

*Primary Examiner* — Mehran Kamran
(74) *Attorney, Agent, or Firm* — Fountainhead Law Group P.C.

(57) ABSTRACT

In one embodiment, during execution of a current workload being processed by the kernel, the method searches policy storage for a similar workload that has been previously optimized, wherein the sensor is used to compare the current workload to workloads in the policy storage. When the similar workload is found, the method optimizes different parameter values in a parameter value range specified in the policy specification for the parameter while the current workload is being processed by the kernel, wherein a parameter setting for the similar workload is used in the optimizing. When the similar workload is not found, the method optimizes different parameter values based on the parameter value range specified in the policy specification for the parameter while the current workload is being processed by the kernel. The method then evaluates the optimizing based on the optimization target.

20 Claims, 6 Drawing Sheets

(56) References Cited

U.S. PATENT DOCUMENTS

| | | | | |
|---|---|---|---|---|
| 2006/0173874 | A1* | 8/2006 | Chen | G06F 17/11 |
| 2006/0259621 | A1* | 11/2006 | Ranganathan | G06F 1/206 709/226 |
| 2009/0271662 | A1* | 10/2009 | Tarta | G06F 11/3672 714/37 |
| 2010/0199267 | A1* | 8/2010 | Rolia | G06Q 10/06 717/135 |
| 2010/0283872 | A1* | 11/2010 | Chan | G06T 1/00 348/241 |
| 2010/0324739 | A1* | 12/2010 | Dawson | G06Q 10/06 700/275 |
| 2011/0126206 | A1* | 5/2011 | Kato | G06F 1/206 718/103 |
| 2011/0231708 | A1* | 9/2011 | Lawrance | G06F 11/3684 714/38.1 |
| 2013/0191676 | A1* | 7/2013 | Mase | G06F 1/28 713/340 |
| 2015/0078674 | A1* | 3/2015 | Jiang | G06T 9/00 382/251 |
| 2015/0242245 | A1* | 8/2015 | Brown | G06F 9/5033 718/105 |
| 2015/0301853 | A1* | 10/2015 | Nandyalam | G06F 9/46 718/105 |
| 2016/0291653 | A1* | 10/2016 | Vootukuru | G01K 13/00 |
| 2016/0328273 | A1* | 11/2016 | Molka | G06F 9/505 |
| 2016/0372160 | A1* | 12/2016 | Lehmann | G11C 5/14 |
| 2017/0109204 | A1* | 4/2017 | Feng | G06F 9/50 |
| 2017/0109685 | A1* | 4/2017 | Bianchi | G06F 8/60 |
| 2017/0139462 | A1* | 5/2017 | Potlapally | G06F 1/329 |
| 2017/0180220 | A1* | 6/2017 | Leckey | H04L 12/4641 |

OTHER PUBLICATIONS

Deadline IO scheduler. Retrieved from: http://en.wikipedia.org/wiki/Deadline_scheduler. and printed on Feb. 3, 2016.

Kernbench. Retrieved from: http://ck.kolivas.org/apps/kernbench/kernbench-0.50/, and printed on Feb. 3, 2016.

NOOP IO scheduler. Retrieved from: http://en.wikipedia.org/wiki/Noop_scheduler, and printed on Feb. 3, 2016.

PostgreSQL. Retrieved from: http://www.postgresql.org/, and printed on Feb. 3, 2016.

Hadoop project. Apr. 10, 2014. Retrieved from: http://hadoop.apache.org.

Dbench. Retrieved from: http://dbench/samba.org/, and printed on Feb. 3, 2016.

MSR Cambridge Traces. Retrieved from: http://iotta.snia.org/tracetypes/3 and printed on Feb. 3, 2016.

The Cilk Project. Retrieved from: http://supertech.csail.mit.edu/cilk/, and printed on Feb. 3, 2016.

TPC-B. Retrieved from: http://www.tpc.org/tpcb/, and printed on Feb. 3, 2016.

TPC-C. Retrieved from: http://www.tpc.org/tpcc/, and printed on Feb. 3, 2016.

TPC-H. Retrieved from: http://http://www.tpc.org/tpch/, and printed on Feb. 3, 2016.

WikiBench. Retrieved from: http://www.wikibench.eu/, and printed on Feb. 3, 2016.

Wikipedia. Retrieved from: https://www.wikipedia.org/, and printed on Feb. 3, 2016.

IOTTA repository. Retrieved from: http://iotta.snia.org/, and printed on Feb. 3, 2016.

Automatically Tuned Linear Algebra Software (ATLAS). In http://math-atlas.sourceforge.net/, and printed on Feb. 3, 2016.

A. C. Arpaci-Dusseau, R. H. Arpaci-Dusseau, N. C. Burnett, T. E. Denehy, T. J. Engle, H. S. Gunawi, J. A. Nugent, and F. I. Popovici. Transforming policies into mechanisms with infokernel. In Proceedings of SOSP, pp. 90-105. ACM, 2003.

S. Bansal and D. S. Modha. CAR: Clock with adaptive replacement. In USENIX Conference on File and Storage Technologies, vol. 4, pp. 187-200, 2004.

S. Boyd-Wickizer, M. F. Kaashoek, R. Morris, and N. Zeldovich. Non-scalable locks are dangerous. In Proceedings of the Linux Symposium, Ottawa, Canada, Jul. 2012.

E. Ciliendo, T. Kunimasa, and B. Braswell. Linux performance and tuning guidelines. In IBM white paper. Jul. 2007.

J. A. Colmenares, G. Eads, S. Hofmeyr, S. Bird, M. Moret, D. Chou, B. Gluzman, E. Roman, D. B. Bartolini, N. Mor, K. Asanovic, and J. D. Kubiatowicz. Tessellation: Refactoring the os around explicit resource containers with continuous adaptation. In Proceedings of 50th ACM DAC, 2013.

D. A. Heger and S. L. Pratt. Workload dependent performance evaluation of the linux 2.6 i/o schedulers. In Proceedings of the Linux Symposium, Ottawa, Canada, 2004.

H. Hoffmann, J. Eastep, M. D. Santambrogio, J. E. Miller, and A. Agarwal. Application heartbeats: A generic interface for specifying program performance and goals in autonomous computing environments. In the 7th IEEE/ACM International Conference on Autonomic Computing and Communications (ICAC), pp. 79-88, 2010.

J. Kobus and R. Szklarski. Completely fair scheduler and its tuning. In draft on Internet. 2009.

B.-H. Lim. Reactive synchronization algorithms for multiprocessors. In Ph.D. thesis of MIT, Feb. 1995.

S. A. M. Marazkis and A. Bilas. Spamd: Stressing i/o in modern servers. In Proceedings of MASCOTS 2012. IEEE, 2012.

N. Megiddo and D. S. Modha. Outperforming lru with an adaptive replacement cache algorithm. Computer, 37(4):58-65, 2004.

J. M. Mellor-Crummey and M. L. Scott. Synchronization without contention. In ACM SIGARCH Computer Architecture News, vol. 19, pp. 269-278. ACM, 1991.

J. Moilanen. I/o workload fingerprinting in the genetic-library. In Proceedings of the Linux Symposium, pp. 1-7, Ottawa, Canada. 2006.

J. Moilanen and P. Williams. Using genetic algorithms to autonomically tune the kernel. In Proceedings of the Linux Symposium, pp. 327-338, Ottawa, Canada, 2005.

T. C. R. Nou and J. Giralt. Automatic i/o of the io scheduler scheduler selection through online workload analysis. In 9th International Conference on UIC/ATC, pp. 431-438. IEEE, 2012.

L. Rudolph and Z. Segall. Dynamic decentralized cache schemes for MIMD parallel processors, vol. 12. ACM, 1984.

P. Sarolahti and A. Kuznetsov. Congestion control in linux tcp. In USENIX Annual Technical Conference, FREENIX Track, pp. 49-62, 2002.

M. I. Seltzer and C. Small. Self-monitoring and selfadapting operating systems. In Proceedings of the Sixth Workshop on Hot Topics on Operating Systems (HotOS), 1997.

D. G. Sullivan. Using probabilistic reasoning to automate software tuning. In Ph.D. thesis in Harvard University, Sep. 2003.

A. Thusoo, J. S. Sarma, N. Jain, Z. Shao, P. Chakka, S. Anthony, H. Liu, P. Wyckoff, and R. Murthy. Hive: a warehousing solution over a map-reduce framework. Proceedings of the VLDB Endowment, 2(2):1626-1629, 2009.

N. Vasi, D. Novakovi, S. Miuin, D. Kosti, and R. Bianchini. Dejavu: accelerating resource allocation in virtualized environments. In Proceedings of the seventeenth international conference on Architectural Support for Programming Languages and Operating Systems (ASPLOS), pp. 423-436, 2012.

T. Wang, J. Zhan, C. Luo, Y. Zhu, Q. Yang, Y. He, W. Gao, Z. Jia, Y. Shi, S. Zhang, C. Zhen, G. Lu, K. Zhan, X. Li, and B. Qiu. Bigdatabench: a big data benchmark suite from internet services. In The 20th IEEE International Symposium on High Performance Computer Architecture (HPOA—2014). ACM, 2014.

Best Practice: If You Cannot Use the Deadline I/O Scheduler, Configure the CFQ I/O Scheduler.. Retrieved from: http://pic.dhe.ibm.com/infocenter/lnxinfo/v3r0m0/index.jsp?topic=\%2Fliaat\%2Fliaatbpblockioperf.htm, and printed on Mar. 8, 2016.

Y. Cui, Y. Wang, Y. Chen, and Y. Shi. Lockcontention-aware scheduler: A scalable and energyefficient method for addressing scalability collapse on multicore systems. In ACM Transactions on Architecture and Code Optimization (TACO), 2013.

(56) References Cited

OTHER PUBLICATIONS

D. B. Bartolini, R. Cattaneo, G. C. Durelli, M. Maggio, M. D. Santambrogio, and F. Sironi. The autonomic operating system research project: achievements and future directions. In Proceedings of 50th ACM DAC, 2013.

A. Puri, H.-M. Hang, and D. Schilling. An efficient block-matching algorithm for motion-compensated coding. In Acoustics, Speech, and Signal Processing, IEEE International Conference on ICASSP'87., vol. 12, pp. 1063-1066. IEEE, 1987.

B. Samadi. Tunex: A knowledge-based system for performance tuning of the unix operating system. In IEEE Transactions on Software Engineering, Jul. 1989.

DTrace Programming Works, DTrace on Solaris 10, OpenSolaris, and other Operating System. Context-Switch, (c) 2006-2008 Context-Switch Limited.

Mike Shapiro, Eric Schrock, and Matt Simmons, "The Modular Debugger", Chpt_mdb_os.fm, pp. 1-96, Jan. 30, 2006. Solarlis Internals, 2d Edition.

M. Loukides and G.-P. D. Musumeci. "System Performance Tuning," O'Reilly, 1990.

\* cited by examiner

```
300─┐
                    302─┐
    Struct eos param {
        const char *name; // unique name of the parameter ─ 304
        const char *subsys; // the subsystem this parameter belongs
308─┐   unsigned long min value, max value; // value range ─┐
310─┐   int linear or exponential search;                   306
312─┐   unsigned long (*getter)(void *param); // optional
        void (*setter)(void *param, unsigned long value); // optional
        void *param; // where the parameter is stored in memory
    };
    struct eos guard {
        struct eos param *param;
        unsigned long value;
    };                          313─┐
    void eos register param(struct eos param *param,
314─┐   struct eos guard *guard)
                                315─┐
    struct eos subsys
316 ─┐  const char *name; // unique name of the subsystem
        void (*get sensors)(int size, unsigned long *sensors,
320─┐       int *similarity threshold);                 318
        unsigned long (*get optimization target)(); ─
        int (*is bottlenecked)(); // returns zero unless bottlenecked
    };
    void eos register subsys(struct eos subsys *subsys);
```

FIG. 3A

```
                    321 int blk probe(void) {
        . . .
        // register disk into system
        add disk(disk);
        // [EOS] I/O scheduling policy for this disk
        struct eos param *param sched;
        param sched = kmalloc(sizeof(struct eos param), GFP KENREL);
322     param sched->name = ... // name based on disk->disk name
        param sched->subsys = "disk";
    324 ⎰ param sched->min value = 0; // three I/O scheduling policies:
        ⎱ param sched->max value = 2; // 0: deadline; 1: cfq; 2: noop
326     . . .
        eos register param(param sched, NULL);
        . . .
    }
```

FIG. 3B

KERNEL POLICY OPTIMIZATION FOR COMPUTING WORKLOADS

BACKGROUND

In computer systems, kernels may implement a small, fixed set of policies, such as disk input/output (I/O) scheduling policies. To provide flexibility, the kernel can expose many parameters that allow users to select a policy or adjust a specific setting of the policy. Adjustable parameters allow users to optimize the policy to achieve a desired performance. However, typically, users lack the domain knowledge of how to adjust the parameters optimally. In this case, most users often use default parameter settings, which may not be optimal for performing the workloads being processed by the computer system.

SUMMARY

In one embodiment, a method receives a specification that specifies a parameter to be optimized, a sensor that is used to evaluate workloads performed by a kernel of the computing device, and an optimization target. During execution of a current workload being processed by the kernel, the method searches policy storage for a similar workload that has been previously optimized, wherein the sensor is used to compare the current workload to workloads in the policy storage. When the similar workload is found, the method optimizes different parameter values in a parameter value range specified in the policy specification for the parameter while the current workload is being processed by the kernel, wherein a parameter setting for the similar workload is used in the optimizing. When the similar workload is not found, the method optimizes different parameter values based on the parameter value range specified in the policy specification for the parameter while the current workload is being processed by the kernel. The method then evaluates the optimizing based on the optimization target.

In one embodiment, a non-transitory computer-readable storage medium contains instructions, that when executed, control a computer system to be configured for: receiving a specification that specifies a parameter to be optimized, a sensor that is used to evaluate workloads performed by a kernel of the computing device, and an optimization target; during execution of a current workload being processed by the kernel, searching policy storage for a similar workload that has been previously optimized, wherein the sensor is used to compare the current workload to workloads in the policy storage; when the similar workload is found, optimizing different parameter values in a parameter value range specified in the policy specification for the parameter while the current workload is being processed by the kernel, wherein a parameter setting for the similar workload is used in the optimizing; when the similar workload is not found, optimizing different parameter values based on the parameter value range specified in the policy specification for the parameter while the current workload is being processed by the kernel; and evaluating the optimizing based on the optimization target.

In one embodiment, an apparatus includes: one or more computer processors; and a non-transitory computer-readable storage medium comprising instructions, that when executed, control the one or more computer processors to be configured for: receiving a specification that specifies a parameter to be optimized, a sensor that is used to evaluate workloads performed by a kernel of the computing device, and an optimization target; during execution of a current workload being processed by the kernel, searching policy storage for a similar workload that has been previously optimized, wherein the sensor is used to compare the current workload to workloads in the policy storage; when the similar workload is found, optimizing different parameter values in a parameter value range specified in the policy specification for the parameter while the current workload is being processed by the kernel, wherein a parameter setting for the similar workload is used in the optimizing; when the similar workload is not found, optimizing different parameter values based on the parameter value range specified in the policy specification for the parameter while the current workload is being processed by the kernel; and evaluating the optimizing based on the optimization target.

The following detailed description and accompanying drawings provide a better understanding of the nature and advantages of particular embodiments.

BRIEF DESCRIPTION OF THE DRAWINGS

FIG. 3A depicts an example of a data structure for a parameter specification that can be stored in a policy cache according to one embodiment.

FIG. 3B shows an example of the data structure that has been annotated and stored in the policy cache according to one embodiment.

DETAILED DESCRIPTION

Described herein are techniques for a kernel policy optimization system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide an optimizer that can optimally generate parameter settings while processing workloads of a computer system. The optimization may be performed in a kernel, such as a monolithic kernel, of the computer system. The optimizer may receive a policy specification via an application programming interface (API). The policy specification defines how an optimizer can tune parameters for a workload. For example, the optimizer may select a policy and also tune the parameter settings for the policy when a workload is processed by the kernel. The optimizer also uses a policy cache that can store previous parameter settings for past workloads. The policy cache may store settings that have been fully optimized and can be reused. Also, the policy cache may store intermediate results that include settings that may not have been completely optimized to achieve the optimal parameter settings. However, by storing these intermediate results, the next time a similar workload runs, the optimizer can resume the optimization. Also, the optimizer uses a hierarchical search engine that can perform the optimization by searching for good parameter settings. In one embodiment, the hierarchical search engine operates at two levels where it first detects which workload is bottlenecked and then searches for a good parameter setting for that workload.

Figure 1:
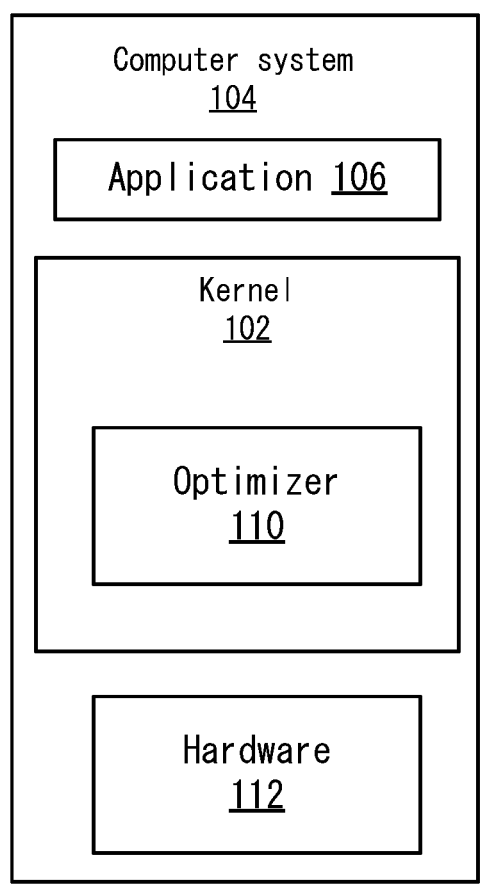
FIG. 1 depicts a simplified system for optimizing parameters for workloads being processed by a kernel according to one embodiment.

FIG. 1 depicts a simplified system 100 for optimizing parameters for workloads being processed by a kernel 102 according to one embodiment. System 100 includes a computer system 104 that includes kernel 102. Kernel 102, which may be referred to as an operating system, is processing operations from an application 106 that is being executed on kernel 102. Although one application is shown, it will be understood that kernel 102 may be processing operations for many applications 106. Additionally, computer system 104 includes hardware 112 (e.g., computer processors, storage, etc.) that kernel 102 runs on. Also, although one computer system 104 is shown, multiple computer systems may be optimized.

In one embodiment, kernel 102 may be a monolithic kernel. A monolithic kernel may be an operating system architecture where the entire operating system is working in the kernel space. The monolithic kernel can dynamically load and unload executable modules at runtime. In this case, one or more modules for an optimizer 110 are loaded into kernel 102. Although a monolithic kernel is described, other kernel architectures may be used, such as a micro kernel. In both kernels, modules can be loaded into them.

Kernel 102 may implement a set of policies, which may be fixed. When policies are fixed, allowing the parameters of the policies to be adjusted allows the performance of computer system 104 to be optimized. For example, policies may include I/O scheduling policies. The scheduling policies are used when kernel 102 schedules operations based on application 106 executing on kernel 102. In one example, scheduling policies include the deadline, complete fairness queuing (CFQ), and NOOP policies. These policies may have between 0 to 12 parameters that each can have different values. The policies may be kernel level or operating system level policies. In one embodiment, the policies at the kernel level are optimized, and not parameters at the application level.

Kernel 102 includes an optimizer 110 that can automatically optimize parameters for kernel 102. The parameters may select which policies are used and also be the parameters for a selected policy. Optimizer 110 optimizes parameters while workloads are being performed by kernel 102. A workload may be an application that is executing, such as an I/O scheduling operation for application 106. Optimizer 110 may optimize parameters for kernel 102 when the workload is executing. Optimizer 110 may first select a policy for the workload and then optimize the parameter values for the policy. If multiple policies do not exist, then optimizer 110 may just optimize parameter values. In one embodiment, optimizer 110 may select multiple policies and/or test multiple parameter values before selecting the optimal policy and parameter settings. This may also be referred to as a tuning process.

Figure 2:
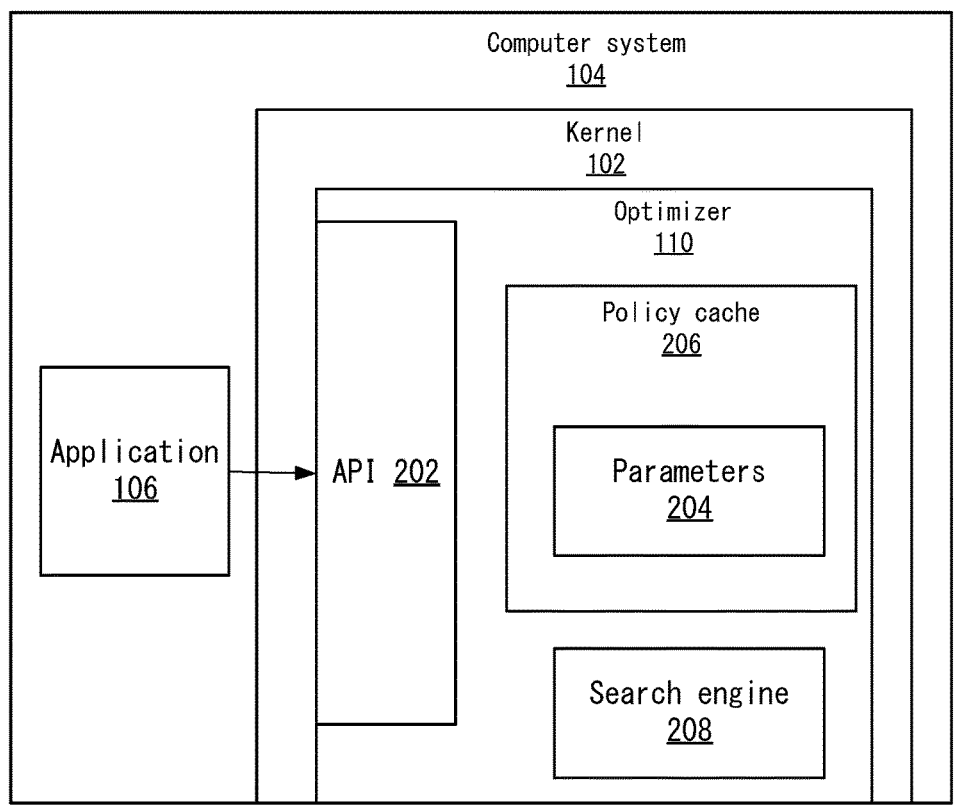
FIG. 2 depicts a more detailed example of an optimizer according to one embodiment.

The different parts of optimizer 110 will now be described in more detail. FIG. 2 depicts a more detailed example of optimizer 110 according to one embodiment. Optimizer 110 includes an application programming interface (API) 202, parameters 204, a policy cache 206, and a search engine 208. Each of these entities may be kernel modules stored in kernel 102.

API 202 allows users using application 106 to describe how parameters can be optimized when workloads are executing. For example, using API 202, users can define metadata of the parameters that annotate the parameters with additional information, such as where the parameters are stored in memory (e.g., such that optimizer 110 can modify them) and the value ranges of the parameters. Optimizer 110 uses the value ranges to limit the search through different parameter values. Also, users can define sensors that capture the characteristics of the workloads, such as the average I/O request size, which optimizer 110 uses to identify workloads. Users may define optimization targets that optimizer 110 uses to measure and evaluate the performance of computer system 104, such as the number of I/O requests per unit of time can be used to measure the I/O scheduling performance. API 202 allows users to pass their domain knowledge to optimizer 110 such that it can automatically optimize the parameters during runtime.

When a user specifies parameter specifications via API 202, the values for parameters 204 may be stored in policy cache 206. Optimizer 110 may store different values for parameters 204 from the specifications received from API 202. The parameters can be used for any workloads that are processed by kernel 102. For example, optimizer 110 may select one of the policies based on a parameter that defines which policies can be used. Then, optimizer 110 may optimize the parameters in the policy while the workload executes. As will be described in more detail below, parameters 204 may be organized into subsystems of kernel 102. A subsystem may be a category of operations, a device, or part of kernel 102. For example, subsystems include a storage disk, printer, and I/O scheduling.

Optimizer 110 may optimize subsystems and is not workload specific. Each workload has the same set of kernel parameters optimized. However, the difference between workloads are they perform differently when optimizer 110 optimizes different parameters. For example, when application 106 is a word processing application that is being used to write a document, in the view of operating system, the performance is better if optimizer 110 optimizes the file writing subsystem instead of other subsystems (although optimizer 110 can still do that, but file writing is the bottleneck here.) But when a user watching video, which may use a lot of computer processing unit (CPU) resources, it makes more sense to optimize the CPU subsystem in this case. For the two cases of file writing workload and the watching video workload, in the view of kernel 102, they have the same set of parameters. However, optimizer 110 may optimize different subsystems with different parameter values.

Policy cache 206 is also used to store parameter settings that have been found during the optimization. This allows the re-use of optimal parameter settings when they are found. Workloads may be stable or repetitive over time. For example, kernel 102 may perform the same or similar workloads repetitively. When optimizer 110 finds a good policy and good parameter settings for a workload, optimizer 110 can store the policy and parameter settings in policy cache 206. This allows the re-use of optimal parameter settings when a similar workload is run again. A second use of policy cache 206 is to store an intermediate result before the search for a good parameter setting is finished for a workload. In one embodiment, since there are many settings to search, optimizer 110 may find a good setting only after the workload is repeated many times. Storing the intermediate settings for a policy in policy cache 206 saves time because optimizer 110 does not have to restart the optimization from the very beginning each time.

Search engine 208 may search for a policy and optimal parameters for a workload. A workload may be considered the same as an application 106. That is, kernel 102 is performing a workload for an application. In one embodiment, search engine 208 may be hierarchical. At a top level, search engine 208 uses a threshold to detect which kernel subsystem (e.g., a subsystem such as I/O scheduling or memory page replacement) to first optimize. For example, search engine 208 may first optimize a kernel subsystem that is considered a biggest bottleneck on the computer system (e.g., using the most computing resources). That is, this kernel subsystem is using more than a threshold of resources or is using the most resources out of the subsystems. Then, for the subsystem, search engine 208 performs the optimization process. For example, search engine 208 searches through policies to select one or more policies. Then, for one or more of the policies, search engine 208 searches for different values for the parameters. For each policy and parameter setting, search engine 208 measures the computer system's performance and selects the best-performing setting. Optimizer 110 may use an algorithm that performs the search through the parameter settings. Although selecting a policy is described, it will be understood that optimizer 110 may just optimize a parameter setting if a policy does not need to be selected.

In one embodiment, optimizer 110 may work best on steady, repeatable workloads. This gives optimizer 110 enough time to search through many policy and parameter settings to find an optimized setting. The search process may take time, which may make optimizing for flash workloads that last for a very short period of time difficult. If steady, repeatable workloads are optimized, then search engine 208 can have time to search for the appropriate policy and parameters to optimize the workloads. The more steady or repeatable a workload, the more likely search engine 208 can find settings for parameters for a policy for the workload. Many workloads are repeatable, especially in server environments because the events that cause flash workloads are rare. Flash workloads may be optimized also, however, since flash workloads are rare and do not reoccur frequent, search engine 208 does not leverage the ability to store intermediate results to optimize workloads that repeat.

Each portion of optimizer 110 will now be described in more detail. In order, the API, policy cache, and then the search engine will be described.

API

API 202 provides data structures and methods that can be used to specify parameter specifications. Users may specify parameters for kernel subsystems. This allows the user to not have to specify optimization parameters on the application level or for specific applications. For a parameter specification, one data structure describes the metadata of a parameter. For example, the parameter specification may be use to specify which policies can be used. Also, the parameter specification may be used to specify information for a parameter. This may include the unique name of the parameter, a kernel subsystem this parameter belongs to, the value range of the parameter, and how to adjust the value of the parameter in the search (e.g., linearly by adding or subtracting a number or exponentially by doubling or halving). Additionally, the data structure provides a setter method for setting the value of the parameter and a getter method for accessing the value of the parameter. Also, the data structure includes a field that points to where the parameter is stored in memory.

A user can enter information for the data structure using API 202. In one embodiment, a user may describe parameters that control the I/O scheduling policy for a storage disk. There may be three disk I/O scheduling policies and the minimum value and the maximum value of this parameter may be 0 and 2, respectively. Another parameter may control the maximum number of disk requests in a disk queue.

FIG. 3A depicts an example of a data structure 300 for a parameter specification that can be stored in policy cache 206 according to one embodiment. At 302, the unique name of the parameter is shown and at 304, the kernel subsystem this parameter belongs to is shown. At 306, the value range can be specified. At 308, how to adjust the value of the parameter in a search can be specified. For example, the search can be linear by adding or subtracting 1 or exponential by doubling or halving. At 310, a user can set how to access the value of the parameter in memory and also, at 312, how to set the value of the parameter.

API 202 allows a user to enter information for a second data structure at 313 that captures the dependencies between parameters. In some cases, a parameter may be active only when another parameter has a certain value. For example, a quantum parameter in a disk I/O subsystem is only active when the scheduler parameter is set to CFQ. Thus, it is useless to optimize the quantum parameter unless the scheduler is set to the value of CFQ. A user may specify the dependencies when providing a parameter in a second data structure.

At 314, a third data structure includes the methods that can be executed by search engine 208 in the optimization process to support a kernel subsystem. For example, at 315, the unique name of the subsystem is provided. This at 316, a get sensors method collects characteristics of a workload that can be used to distinguish between different workloads. The get sensors method may specify the size of the sensors and also the similarity thresholds that can define whether workloads are similar. The sensors hold the concrete values of the workload characteristics such as the average size of all I/O requests. The similarity threshold specifies a percentage variance such that two sets of values that are within the similarity threshold may be considered the same.

At 318, a second get-optimization target method returns a value representing the kernel subsystem performance on the workload. Optimizer 110 seeks to maximize this value when searching through different parameter settings. A user can choose to provide workload-specific optimization targets.

At 320, a third method may be a bottleneck check method that checks whether the subsystem is a bottleneck right now. For example, the method may compare the percentage of time the subsystem is busy within a threshold, such as 80%.

FIG. 3B shows an example of the data structure 320 that has been annotated and stored in policy cache 206 according to one embodiment. This data structure is a parameter for an I/O scheduling subsystem. This parameter may control the I/O scheduling policy for a disk. Since there are three disk I/O scheduling policies, the minimum value and the maximum value of this parameter are 0 and 2 respectively. That is the value of 0 uses the deadline I/O scheduling policy, the value of 1 uses the cfq I/O scheduling policy, and the value of 2 uses the noop I/O scheduling policy.

In this case, at 321, the name is a disk name that is based on the storage disk name. At 322, the subsystem is "disk". This may be a storage subsystem in the kernel. Also, at 324, the range of values for the parameter is set at a minimum value of 0 and a maximum value of 2. At 326, the parameter can be registered for the I/O scheduling policy for the disk.

Policy Cache and Search Engine

Policy cache 206 may store optimized parameter settings and allow reuse of these parameter settings on similar workloads. This may greatly reduce the time spent searching for good parameter settings. Also, policy cache 206 can help make the search incremental. For example, when a workload runs for a time shorter than what it would take search engine 208 to find a good parameter setting, search engine 208 stores the intermediate search result in policy cache 206 such that next time a similar workload runs, search engine 208 can resume the search.

In one embodiment, policy cache 206 includes different sub-caches for each kernel subsystem because each subsystem's parameters are typically independent of another subsystem's parameters. A sub-cache may be organized as a list of workload signature and parameter setting pairs. That is, the workload signature captures characteristics of the workload and the optimized parameter settings. Even though the parameter definition was for a subsystem, policy cache 206 can store parameters settings that are optimized when a workload executes. Search engine 208 may compute the workload signature using the sensors that were provided in the policies.

To search a sub-cache to see if a workload signature exists in the sub-cache, search engine 208 uses the sensors to compute the signature of the workload, referred to as $s_1$. Search engine 208 then scans the list and compares the signature with each signature $s_2$ on the list to see if signature $s_1$ is within the similarity threshold of signature $s_2$. For example, if signature $s_1$ has a value of 8 and signature $s_2$ has a value of 10, and the similarity threshold is 20%, then search engine 208 considers that these two fields have similar values because 8 is within 20% of 10. In one embodiment, a signature may include multiple fields and if search engine 208 determines that all fields of the two signatures are similar, optimizer 110 considers the two workloads similar and reuses the setting associated with the workload signature $s_2$ for the workload signature $s_1$. In one example, search engine 208 may measure the size of I/O requests for a workload. If the average size is within a threshold to the average size for a stored setting, then that setting is used.

In one embodiment, there may be multiple entries matching a given signature. Search engine 208 may select one of these signatures, such as a first match or may analyze which entry is closest to the signature percentage-wise. When intermediate search results need to be stored, search engine 208 may store additional information used by search engine 208 in addition to the current parameter setting. When a similar workload runs, search engine 208 uses the additional information to resume the search. The additional information may include a flag that indicates that the parameter has been searched, and what setting values have been tried and the results. The search may continue for another parameter as the optimization continues. Search engine 208 may then optimize this next parameter and store intermediate results. When all parameters for the workload have been searched and optimized, the parameter settings for all parameters may be used for the workload and stored.

In one embodiment, search engine 208 may perform a search hierarchically. For example, search engine 208 first detects which subsystem of kernel 102 is bottlenecked and then searches for a good parameter setting for the bottlenecked subsystem. This may be a setting for one parameter or for multiple parameters. Once a subsystem is no longer bottlenecked, search engine 208 may detect that a second subsystem is bottlenecked. Then, search engine 208 moves to optimize the second subsystem by searching for a parameter setting for that subsystem. This focuses on one subsystem at a time as most likely, there is only one bottleneck at a time. If there is another bottleneck after the first bottleneck is removed, then search engine 208 may attempt to optimize that subsystem. In one embodiment, to detect whether a subsystem is bottlenecked, search engine 208 invokes each subsystem's bottleneck method. This method may detect whether or not the subsystem is using computing resources that are over a threshold.

Once search engine 208 determines that a subsystem is bottlenecked, search engine 208 may first determine a sub-cache for the kernel subsystem in policy cache 206. Then, for the list of workload signatures in the sub-cache, search engine 208 determines a signature that matches the current workload. If the signature has a good parameter setting, search engine 208 may apply that parameter setting to the kernel subsystem that is executing workload. Even though a good parameter setting may be found, search engine 208 may still attempt to optimize the parameters.

When a similar workload does not exist in policy cache 206, search engine 208 searches for a good parameter setting. In one embodiment, search engine 208 may select a parameter and iterate through the values to find the best value for the parameter. In one embodiment, search engine 208 optimizes multiple parameters for a subsystem, but one parameter at a time. This allows search engine 208 to evaluate the performance change due to changing a value for the parameter. The optimization targets can be used to determine when a good value is found. Search engine 208 may then combine the best values into a parameter setting file. The parameter setting file may store the intermediate parameter settings for one or more parameters that were searched. This allows the intermediate results to persist and be used again. The parameters may be largely independent so that they can be searched separately and the effects of the parameters on performance may be largely monotonic. That is, if increasing the value of the parameter improves performance, then, search engine 208 should keep increasing the value.

In one embodiment, search engine 208 may prioritize optimizing parameters that have more limited values. That is, search engine 208 selects a parameter with a smallest number of possible values and optimizes that parameter first. Since the number of possible values is smaller, the difference in the values may often have a larger impact on performance. Thus, once search engine 208 finds a good value for a parameter at the beginning of the search process, kernel 102 experiences a better application performance for the rest of the search, which improves the average application performance. Also, search engine 208 respects the dependencies between parameters. As discussed above, users express when a parameter is active it should not be dependent on another parameter that is also active. Search engine 208 does not try to optimize a parameter if it is not active.

Figure 4:
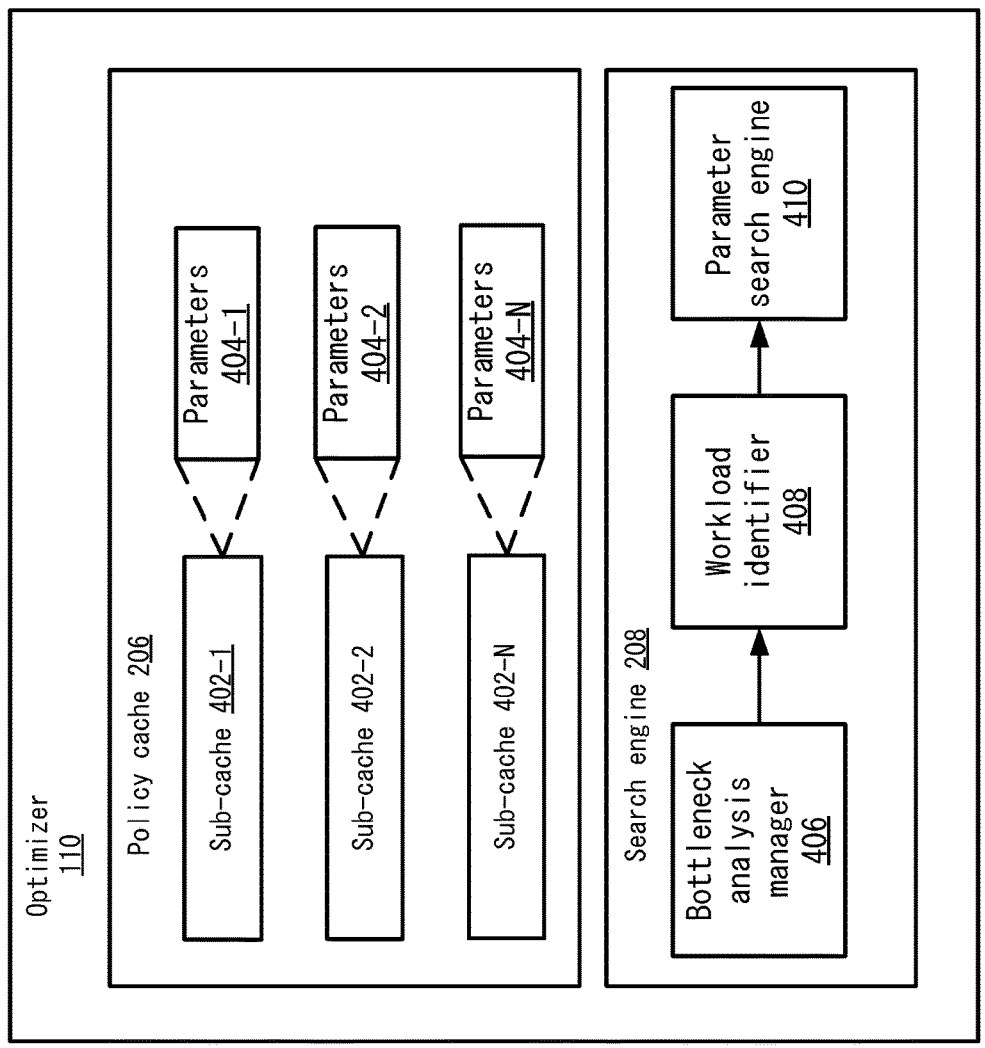
FIG. 4 shows a more detailed example of the policy cache and the search engine according to one embodiment.

FIG. 4 shows a more detailed example of policy cache 206 and search engine 208 according to one embodiment. Policy cache 206 includes a number of sub-caches 402-1-402-n. Each sub-cache may be associated with a different subsystem. Also, each subsystem may have individual parameters. An example of a subsystem may be a part of kernel (operating system). For example, subsystems are resource controllers that allocate varying levels of system resources to its users. Also, each subsystem may include a number of parameters 404-1-404-N, respectively.

Search engine 208 includes a bottleneck analysis manager 406 that can determine when subsystems are bottlenecked. In one embodiment, bottleneck analysis manager 406 may detect a subsystem is bottlenecked by invoking each subsystem's bottleneck method that may have been defined in the API policy specification. Each subsystem's bottleneck method may then return a number that indicates how much computing resources are being used by that subsystem. Bottleneck analysis manager 406 can then determine which subsystem is bottlenecked.

Once the bottlenecked subsystem is identified, a workload identifier 408 determines if a similar workload exists in a sub-cache 402 that is associated with a workload being performed by the subsystem. For example, if the subsystem is associated with sub-cache 402-1, workload identifier 408 uses the sensors defined for the current workload to generate a signature $s_1$. Then, workload identifier 408 analyzes signatures $s_2$ within sub-cache 402-1 to determine if there is a match. For example, the sub-cache may be organized as a list of workload signatures and parameter setting pairs. When a workload in the sub-cache includes a signature $s_2$ that is similar to the current signature $s_1$, workload identifier 408 selects that workload $5_2$ and retrieves the parameter setting. This is considered a warm start because parameter settings from a previous search are being used. When no signatures $s_2$ in sub-cache 402-1 match the current workload signature $s_1$, then the optimization starts cold. That is, there are no parameter values to use to start off with from prior workloads being optimized.

Parameter search engine 410 then performs the optimization by searching through different parameter values for the current workload $s_1$. For example, when a similar workload $s_2$ already exists, parameter search engine 410 may start using those parameter settings. In one embodiment, these parameter settings may provide good performance for the current workload $s_1$. Parameter search engine 410, however, may continue to adjust the parameters to determine if performance is better or worse. For example, parameter search engine 410 may use the additional information attached to the workload $s_2$ to determine which parameter settings have been tested already. These settings may not be tested again. Then, parameter search engine 410 may adjust a value of one parameter and determine if performance becomes better or worse. If performance becomes worse, then parameter search engine 410 may start decrementing the parameter values to determine if performance becomes better or worse. If performance becomes better, then parameter search engine 410 may continue to adjust the value in the same direction to see if performance continues to improve. If both increasing and decreasing the values does not improve performance, then parameter search engine 410 may determine that the original parameter setting is optimal. This process may be performed for multiple parameters.

In the case of a cold start, where a parameter setting in the sub-cache 402 is not found for the current workload, then parameter search engine 410 may start from a selected value. The selected value may be a random value, the minimum value, the maximum value, or a median value. Then, parameter search engine 410 performs a search. The search may have been specified in the policy specification, such as an incremental or exponential search. In either case, parameter search engine 410 may increase the parameter value to determine if performance is better or worse. If performance is not better, parameter search engine 410 may then decrease the value. Parameter search engine 410 may then sift through these values for the parameter in the optimization range to determine which parameter value is optimal.

Parameter search engine 410 uses the optimization target to determine whether or not performance is better or worse. For example, the optimization target may be the number of I/O requests. If the number of requests are smaller, then the setting is considered better in one example. Once parameter search engine determines optimal results, parameter search engine 410 stores the results as a workload parameter setting pair in sub-cache 402-1

Figure 5:
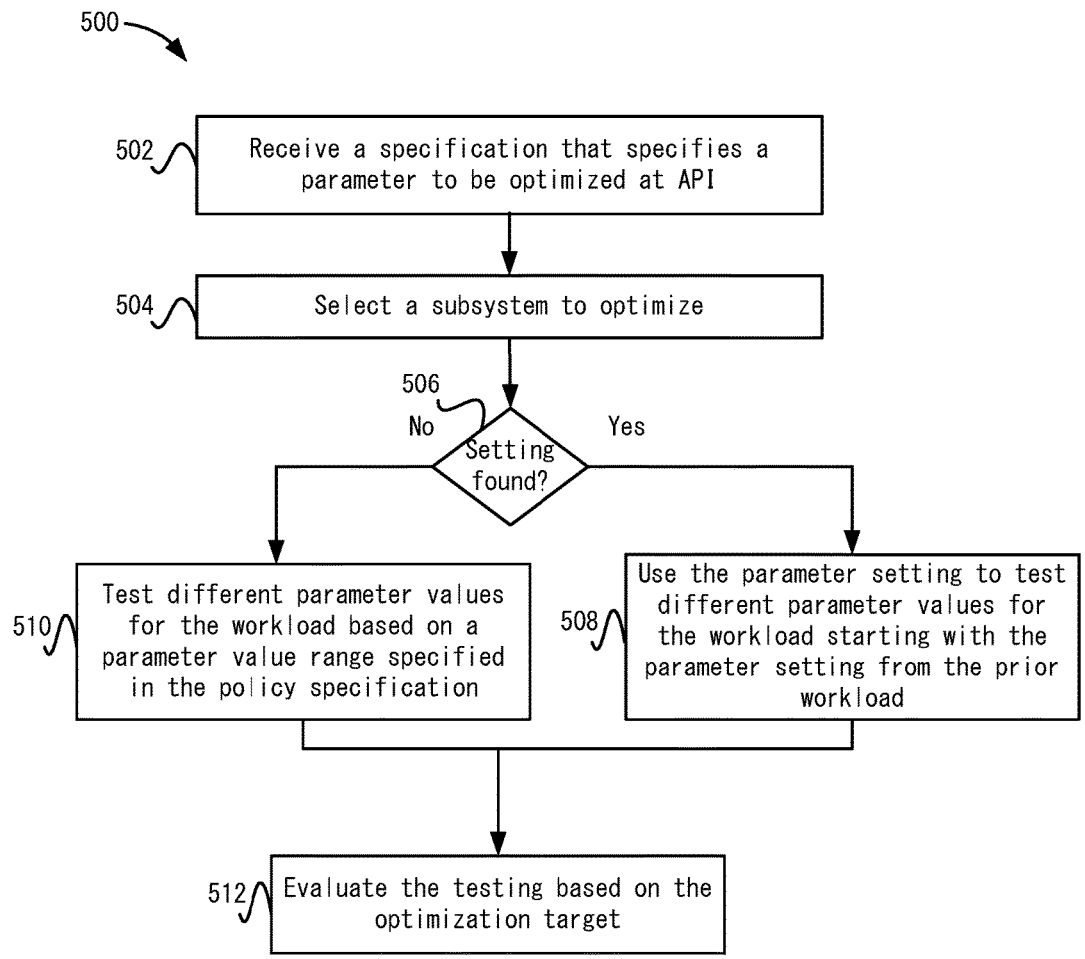
FIG. 5 depicts a simplified flowchart of a method for optimizing parameters according to one embodiment.

FIG. 5 depicts a simplified flowchart 500 of a method for optimizing parameters according to one embodiment. At 502, optimizer 110 receives a specification that specifies a parameter to be optimized at API 202. The specification may also include a sensor that is used to evaluate workloads performed by kernel 102 and optimization targets.

At 504, optimizer 110 selects a subsystem to optimize. For example, optimizer 110 determines which subsystem is currently bottlenecked the most in kernel 102. Then, at 506, optimizer 110 searches policy cache 206 for a parameter setting from a similar workload as a current workload being performed by the subsystem. Optimizer 110 uses the sensor to determine when a workload is similar. In some cases, a similar workload may be found and in some cases, no previous workload is similar to the current workload.

At 506, optimizer 110 determines if a similar workload and parameter setting is found. When a parameter setting is found, at 508, optimizer 110 uses the parameter setting to test different parameter values for the workload starting with the parameter setting from the prior workload. That is, optimizer 110 finishes the optimization process for the current workload when the optimization process was not previously finished. This tests different parameter values while the kernel is processing the workload.

When a parameter setting is not found, at 510, optimizer 110 tests different parameter values for the workload based on a parameter value range specified in the policy specification. This starts the optimization process cold, but also tests different parameter values while the kernel is processing the workload.

In both the warm and cold starts, at 512, optimizer 110 evaluates the optimizing based on the optimization target. That is, optimizer 110 may change a value and determine if performance improves. This process continues until optimizer 110 finds an optimal performance value in the parameter value range.

I/O Scheduling Example

In one embodiment, API 202 may be used to annotate four parameters that may have a performance impact on computer system 104. The first parameter specifies which I/O scheduling policy to use for a disk. For example, kernel 102 may support three policies: (1) completely fair queuing, (2) deadline-based scheduling, (3) first-come/first-served. To change this parameter, a method is specified such that search engine 208 can change the parameter during runtime. The second parameter specifies the maximum number of requests on a disk queue. A third parameter specifies how many memory pages to read ahead. A last parameter specifies a time slice allocated to each workload when the I/O scheduling policy is set to completely fair queuing.

To identify workloads, API 202 proceeds to set five sensors: the number of concurrent processes; the read/write ratio of the request; the average I/O request size; the average seek distance between two consecutive disk requests; and the average time between two consecutive requests. These sensors may capture typical workload characteristics that significantly affect performance. Search engine 208 may use these characteristics to search for a similar workload in policy cache 206. API 202 is also used to set the optimization target to be the number of sectors read or written per second.

Once the policy is input via API 202, search engine 208 may determine when a workload matches the signature provided by the five sensors. When this occurs, search engine 208 may search through policy cache 206 for parameter settings that are associated with the workload. Search engine 208 may perform different optimizations. For example, policy cache 206 may not include any information that matches a workload for the policy. That is, policy cache 206 is cold in that no optimization for a workload that matches the policy is available. Search engine 208 may then search through a number of parameter settings and determine which parameter settings provide the best performance. In one embodiment, search engine 208 may take a certain amount of time to decide on a parameter setting, such as between 100-150 seconds. Also, there may be a warm cache where policy cache 206 includes intermediate results that search engine 208 can use to continue the optimization. When the settings are found, then search engine 208 may adjust the settings and measure the performance based on the optimization targets. This search may take less time than a cold search.

CPU Scheduling Example

In a CPU scheduling subsystem, API 202 may be used to specify three parameters. For example, a first parameter specifies the length of time for scheduling each runable process once; a second parameter specifies the minimum time a process is guaranteed to run when scheduled; and a third parameter describes the ability of processes being woken up to preempt the current process. The larger value makes it more difficult to preempt the current process.

To identify workloads, API 202 is used to specify one sensor—the number of retired instructions executed in the user space. The optimization target may be the same as the sensor. When a workload is executed, search engine 208 determines that the workload is associated with this policy based on the number of retirement instructions being executed in the user space. Then, search engine 208 determines the three parameters and can analyze the performance of computer system 104 when the parameters are changing. In one embodiment, search engine 208 may adjust the CPU scheduling parameters to preempt threads more often so that a few threads with work to do can make good progress while futile work scaling requests that waste many CPU cycles are not scheduled. In this case, during execution of a subsystem, many threads have no work to do but are busy trying to steal work from other threads without yielding CPU. This wastes many CPU cycles. Search engine 208 thus determines a parameter setting that limits the scheduling of these CPU threads that have no work to do.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
searching, by a computing device, from a starting parameter value through a first set of parameter values in a parameter value range specified in a policy specification for a parameter while a first workload of a plurality of workloads is being processed by a kernel of the computing device;
storing, by the computing device, an intermediate parameter setting for the policy specification in a policy storage for the first set of parameter values that were used in the searching;
during execution of a second workload in the plurality of workloads being processed by the kernel, searching, by the computing device, the policy storage for a similar workload that has been previously optimized, wherein a sensor is used to compare the second workload to the first workload in the policy storage to determine if the first workload and the second workload are similar;
when the first workload and the second workload are similar, performing:
retrieving, by the computing device, the intermediate parameter setting from the policy storage;
adjusting, by the computing device, parameter values in the parameter value range while the second workload in the plurality of workloads is being processed by the kernel using a second set of parameter values, wherein a search through the second set of parameter values starts from a parameter value that is not from the first set of parameter values and the starting parameter value; and
evaluating, by the computing device, an effect on performance of the computing device from using the first set of parameter values and the second set of parameter values based on an optimization target to determine an optimized parameter value from the first set of parameter values and the second set of parameter values for reuse;
storing, by the computing device, the optimized parameter value for the policy specification in the policy storage for reuse by similar workloads; and
when the similar workload is not found, searching, by the computing device, from the starting parameter value through a third set of parameter values in the parameter value range for the parameter while the second workload is being processed by the kernel.

2. The method of claim 1, wherein the intermediate parameter setting is stored when the optimized parameter value is not determined yet.

3. The method of claim 2, wherein the at least one value in second set of parameter values tests at least one value in the parameter value range not found in the first set of parameter values.

4. The method of claim 1, wherein the first set of parameter values and the second set of parameter values are for different policies.

5. The method of claim 1, wherein the first set of parameter values and the second set of parameter values are for a policy used by the kernel to process the first workload and the second workload.

6. The method of claim 1, wherein the plurality of workloads are associated with a subsystem in the kernel.

7. The method of claim 6, further comprising:
analyzing resource usage for a plurality of subsystems; and
selecting the subsystem from the plurality of subsystems based on the resource usage.

8. The method of claim 7, wherein the subsystem that is selected has a largest resource usage.

9. The method of claim 1, wherein searching from the starting parameter value through the first set of parameter values in the parameter value range specified in the policy specification for the parameter while the first workload of the plurality of workloads is being processed comprises:
changing a parameter value in the first set of parameter values for the parameter; and
evaluating the performance of the computing device based on the changing.

10. The method of claim 1, wherein:
the first workload is selected from a group of similar workload signatures, and
the first workload has a similar workload signature that is within a threshold of a current workload signature for the second workload.

11. The method of claim 1, further comprising:
evaluating a dependency for the parameter; and
optimizing the parameter only when a dependency is not violated.

12. method of claim 1, wherein the sensor specifies a characteristic of the first workload and the second workload.

13. The method of claim 1, wherein another parameter is optimized after the optimized parameter value is determined.

14. The method of claim 1, wherein the parameter is selected from a plurality of parameters due to the parameter having the parameter value range of possible values that is a smallest number of possible values.

15. The method of claim 1, further comprising:
changing a direction of increasing or decreasing the parameter value based on the evaluating of the performance.

16. A non-transitory computer-readable storage medium containing instructions, that when executed, control a computer system to be configured for:
searching from a starting parameter value through a first set of parameter values in a parameter value range specified in a policy specification for a parameter while a first workload of a plurality of workloads is being processed by a kernel- of a computing device;
storing an intermediate parameter setting for the policy specification in a policy storage for the first set of parameter values that were used in the searching;
during execution of a second workload in the plurality of workloads being processed by the kernel, searching the policy storage for a similar workload that has been previously optimized, wherein a sensor is used to compare the second workload to the first workload in the policy storage to determine if the first workload and the second workload are similar;
when the first workload and the second workload are similar, performing:
retrieving the intermediate parameter setting from the policy storage;
adjusting parameter values in the parameter value range while the second workload in the plurality of workloads is being processed by the kernel using a second set of parameter values, wherein a search through the second set of parameter values starts from a parameter value that is not from the first set of parameter values and the starting parameter value; and
evaluating an effect on performance of the computing device from using the first set of parameter values and the second set of parameter values based on an optimization target to determine an optimized parameter value from the first set of parameter values and the second set of parameter values for reuse;
storing the optimized parameter value for the policy specification in the policy storage for reuse by similar workloads; and
when the similar workload is not found, searching from the starting parameter value through a third set of parameter values in the parameter value range for the parameter while the second workload is being processed by the kernel.

17. The non-transitory computer-readable storage medium of claim 16, wherein:
the intermediate parameter setting is stored when the optimized parameter value is not determined yet, and
at least one value in second set of parameter values tests at least one value in the parameter value range not found in the first set of parameter values.

18. The non-transitory computer-readable storage medium of claim 16, wherein the plurality of workloads are associated with a subsystem in the kernel.

19. The non-transitory computer-readable storage medium of claim 16, wherein searching through the parameter value range specified in the policy specification for the parameter while the first workload of the plurality of workloads is being processed comprises:
changing a parameter value in the first set of parameter values for the parameter; and
evaluating the performance of the computing device based on the changing.

20. An apparatus comprising:
one or more computer processors; and
a non-transitory computer-readable storage medium comprising instructions, that when executed, control the one or more computer processors to be configured for:
searching from a starting parameter value through a first set of parameter values in a parameter value range specified in a policy specification for a parameter while a first workload of a plurality of workloads is being processed by a kernel- of a computing device;
storing an intermediate parameter setting for the policy specification in a policy storage for the first set of parameter values that were used in the searching;
during execution of a second workload in the plurality of workloads being processed by the kernel, searching the policy storage for a similar workload that has been previously optimized, wherein a sensor is used to compare the second workload to the first workload in the policy storage to determine if the first workload and the second workload are similar;
when the first workload and the second workload are similar, performing:
retrieving the intermediate parameter setting from the policy storage;
adjusting parameter values in the parameter value range while the second workload in the plurality of workloads is being processed by the kernel using a second set of parameter values, wherein a search through the second set of parameter values starts from a parameter value that is not from the first set of parameter values and the starting parameter value; and evaluating an effect on performance of the computing device from using the first set of parameter values and the second set of parameter values based on an optimization target to determine an optimized parameter value from the first set of parameter values and the second set of parameter values for reuse;

storing the optimized parameter value for the policy specification in the policy storage for reuse by similar workloads; and when the similar workload is not found, searching from the starting parameter value through a third set of parameter values in the parameter value range for the parameter while the second workload is being processed by the kernel.

\* \* \* \* \*